(12) United States Patent
Nishio et al.

(10) Patent No.: US 6,245,420 B1
(45) Date of Patent: Jun. 12, 2001

(54) TRANSFER BELT FOR USE IN AN ELECTROSTATOGRAPHIC DUPLICATOR

(75) Inventors: Hiroyuki Nishio; Kazutoshi Ishida; Toshimichi Takada; Yorifumi Hineno; Arata Hasegawa, all of Kobe (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/468,550

(22) Filed: Dec. 21, 1999

(30) Foreign Application Priority Data

Dec. 21, 1998 (JP) .......................................... 3-62883

(51) Int. Cl.[7] ............................ G03G 15/06; B32B 25/04
(52) U.S. Cl. ............................ 428/292.1; 428/295.1; 428/500; 492/25; 399/130; 399/154; 399/162; 525/403
(58) Field of Search ............................ 428/292.1, 295.1, 428/500; 492/25; 799/154, 130, 162; 525/403

(56) References Cited

U.S. PATENT DOCUMENTS 5,733,235   3/1998   Waku et al. .

FOREIGN PATENT DOCUMENTS

| 08292640 | 11/1996 | (JP) . |
| 09146345 | 6/1997 | (JP) . |
| 09196056 | 7/1997 | (JP) . |
| 10133488 | 5/1998 | (JP) . |

*Primary Examiner*—Richard Weisberger
(74) *Attorney, Agent, or Firm*—Wood, Phillips, VanSanten, Clark & Mortimer

(57) ABSTRACT

A transfer belt for use on an electrostatographic duplicator. The belt has a body defining an image transfer surface. The body is made up of a rubber composition including a combination of epichlorohydrin-ethyleneoxide copolymer and hydrogenated nitrile rubber, to which a metallic salt of an unsaturated carboxylic acid and an organic peroxide are added.

22 Claims, 1 Drawing Sheet

TRANSFER BELT FOR USE IN AN ELECTROSTATOGRAPHIC DUPLICATOR

BACKGROUND OF THE INVENTION

1. Field of the Invention

This invention relates to rubber belts and, more particularly, to a rubber belt that can be used to transfer an image to an object.

2. Background Art

Electrophotography is one form of electrostatography used in duplication. One process for performing electrophotographic duplication is carried out as follows. The first step is a charging step which involves applying a uniform electrostatic charge to a surface of a photoreceptor. An exposure step is then carried out to irradiate the charged photoreceptor with a light source, such as a laser light, to charge a predetermined pattern. In a development step, an image is formed by attaching a toner with the electrostatic charge. In a transfer step, the toner, defining the image, is transferred to ordinary paper or a film that is oppositely charged. The image is then fixed by transporting the paper or film, with the attached toner, through a heated fixing roll. Thereafter, the remaining charge and toner are removed to allow the photoreceptor to be reused.

In a conventional duplicating apparatus, the above development step is carried out by applying toner through the electrostatic charge developed on a transfer drum in contact with the photoreceptor. Generally, this mechanism involves a large number of parts, among which are a transfer drum, rollers, a charger, etc. As a result, the equipment tends to become complicated and expensive. With a large diameter transfer drum, operation of the transfer drum at high speeds tends to cause ordinary paper in contact with the transfer drum to attach thereto and cause clogs or jams.

In recent years, transfer belts have commonly replaced transfer drums. Transfer belts are often incorporated to produce a space efficient design. Further, the transfer belts are able to effect image transfer at high rotational speeds.

In a typical transfer belt, a conductive powder, such as conductive carbon black, graphite, metallic powder, and the like, is mixed with rubber. Electrical conductivity results from the contact of the particles in the conductive powder with each other. However, it is extremely difficult to uniformly disperse the conductive powder in the rubber. As a result, the resistance tends to vary throughout the transfer belt. As a result, the desired volume resistance may not be maintained in the desired medium resistance range of $10^8$ to $10^{11}$ $\Omega$cm.

It is also known to add carbon black to rubber to increase its modulus and thereby reduce the elongation of the belt. Carbon black is generally required to be added at a high density. However, at high density, the carbon black tends to be dispersed non-uniformly, again potentially resulting in non-uniform electrical resistance properties.

It is known to use silica to increase the viscosity of the rubber. However, this tends to reduce workability and the resulting rubber tends to be brittle.

It is also known to produce anti-static properties by mixing a surface active agent and a filler consisting of a metallic oxide in a conductive rubber composition.

However, to achieve desired anti-static properties using the metallic oxide, generally a relatively large amount thereof must be used. While this improves the anti-static characteristics of the rubber, the modulus and permanent distortion resistance tend to decrease. Further, the anti-static characteristics attributable to the use of a surface active agent may be temporary. Bleeding may produce stickiness on the transfer surface. Even after charge removal and cleaning steps are carried out, there may be some residual toner attached to the transfer surface.

It is also known to form a transfer belt using a rubber composition made by mixing rubber, such as ethylene-propylene rubber (EPR), ethylene-propylene-diene rubber (EPDM), natural rubber, SBR, and the like, with epichlorohydrin.

With belts having a rubber composition that is a mix of EPR or EPDM with epichlorohydrin, the problem of the toner clinging to the transfer surface is eliminated to at least a certain extent. However, because the volume resistance of EPDM is typically as high as from $10^{15}$ to $10^{18}$ $\Omega$cm, the amount of EPDM that can be mixed is limited to an amount that produces a resistance in the normally desired range of $10^8$ to $10^{11}$ $\Omega$cm. The resulting belt may have a low modulus, which may result in lack of a desired clarity of the transferred image.

SUMMARY OF THE INVENTION

In one form, the invention is directed to a transfer belt for use in an electrostatographic duplicator. The belt has a body defining an image transfer surface. The body is made up of a rubber composition including a combination of epichlorohydrin-ethyleneoxide copolymer and hydrogenated nitrile rubber, to which a metallic salt of an unsaturated carboxylic acid and an organic peroxide are added.

This construction lends itself to making a transfer belt with a volume specific resistance in the medium resistance range of $10^8$ to $10^{11}$ $\Omega$cm, with relatively uniform electrical resistance. With this structure a transfer belt may be made with a high modulus and a controlled degree of resistance to permit clear image transfer at relatively high speeds.

The body may further have short fibers embedded therein. The fibers may consist of a polymer graft-bonded to polyamide fibers. The polymer grafted to the fibers may be at least one of polyolefin and rubber.

The fibers may have a diameter not greater than 3.0 $\mu$m.

The short fibers may be present in an amount of no more than 30 parts by weight per 100 parts by weight of the combination of epichlorohydrin-ethyleneoxide copolymer and hydrogenated nitrile rubber.

The body may further include silica present in an amount of 1:50 parts by weight of silica per 100 parts by weight of the combination of epichlorohydrin-ethyleneoxide copolymer and hydrogenated nitrile rubber.

The body may have an endless shape.

The epichlorohydrin-ethyleneoxide copolymer may be at least one of epichlorohydrin-ethyleneoxide-allylglycidylether copolymer and an epichlorohydrin-ethyleneoxide-propyleneoxide-allylglycidylether copolymer.

The hydrogenated nitrile rubber may have an oxidation degree of at least 80%, and more preferably 90%.

The metallic salt of an unsaturated carboxylic acid may be formed by ion-bonding an unsaturated carboxylic acid having a carboxyl group with a metal.

The unsaturated carboxylic acid may have at least one of: a monocarboxylic acid; a monocarboxylic acid that is an acrylic acid; a methacrylic acid; a dicarboxylic acid; a dicarboxylic acid that is a maleic acid; a dicarboxylic acid that is a fumaric acid; and a dicarboxylic acid that is an itaconic acid.

The metal may be at least one of beryllium, magnesium, calcium, strontium, barium, titanium, chromium, molybdenum, manganese, iron, cobalt, nickel, copper, silver, zinc, aluminum, tin, and antimony.

The metallic salt may be an unsaturated carboxylic acid present in an amount of 5–200 parts by weight per 100 parts by weight of the combination of epichlorohydrin-ethyleneoxide copolymer and hydrogenated nitrile rubber.

The organic peroxide may be at least one of di-t-butylperoxide, dicumylperoxide, t-butylcumylperoxide, 1,1-t-butylperoxy-3,3,5-trimethylcyclohexane, 2,5-dimethyl-2,5-di(t-butylperoxy)hexane, 2,5-dimethyl-2,5-di(t-butylperoxy)hexane-3, bis(t-butylperoxydiisopropyl)benzene, 2,5-dimethyl-2,5-di(benzoylperoxy)hexane, t-butylperoxy benzoate, and t-butylperoxy-2-ethylhexyl carbonate.

The organic peroxide may be present in an amount of 0.2–10 parts by weight of pure peroxide per 100 parts by weight of the combination of epichlorohydrin-ethyleneoxide copolymer and hydrogenated nitrile rubber.

The ratio of epichlorohydrin-ethyleneoxide copolymer to hydrogenated nitrile rubber may be between 10:90 and 90:10.

The transfer belt may further include a co-crosslinking agent to increase the crosslinking efficiency by the organic peroxide. The co-crosslinking agent may be at least one of TAIC, TAC, maleimide, quinonedioxime, trimethylolpropane trimethacrylate, and sulfur.

The transfer belt may further include a vulcanizing agent for the epichlorohydrin-ethyleneoxide copolymer that is at least one of red lead/ethylene tiourea and magnesium oxide/2,4,6-trimercapto-S-triazine.

The transfer belt may further include a filler for the rubber in the body that is at least one of carbon black and silica.

The body may have a thickness of from 300–600 $\mu$m.

The invention is also directed to an electrostatographic duplicator including a base element having a transfer belt as described above, a toner supply which is strategically transferred to the image transfer surface on the body of the transfer belt, and a drive for rotating the base element to thereby cause an image on the image transfer surface to be applied to an object.

DETAILED DESCRIPTION OF THE DRAWINGS

Figure 1:
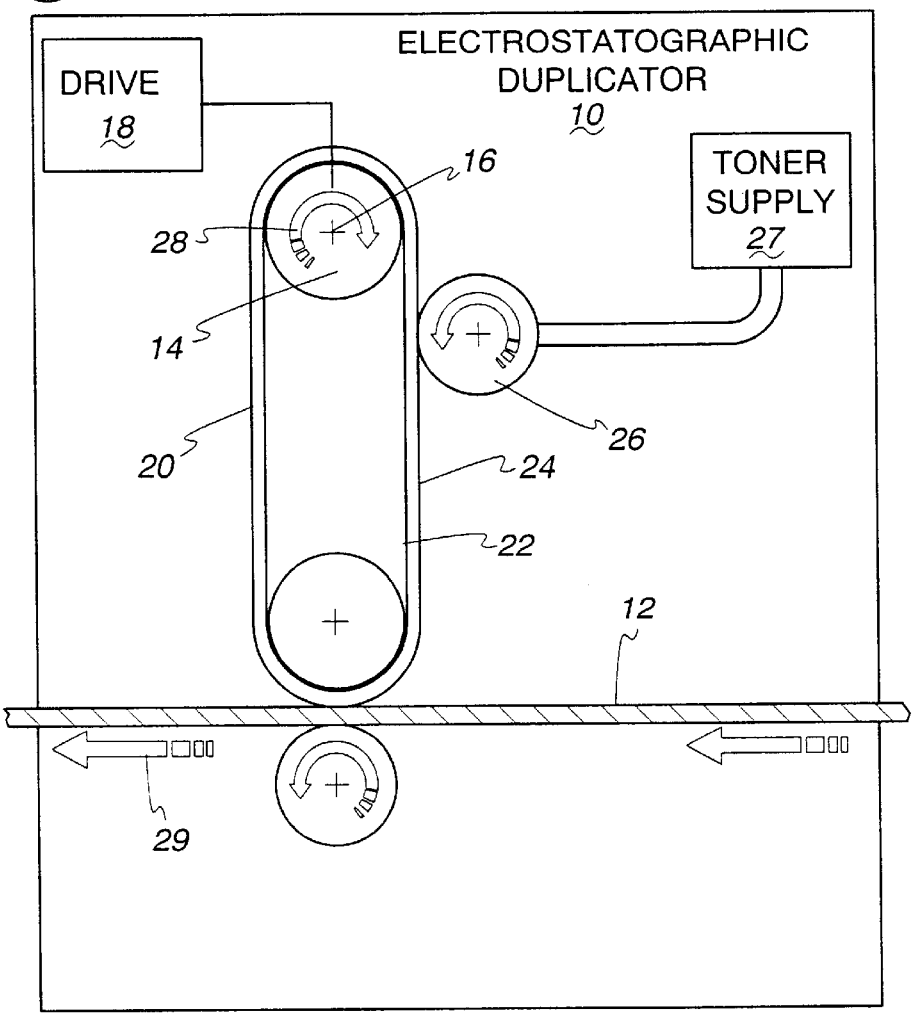
FIG. 1 is a schematic representation of an electrostatographic duplicator with a transfer belt, according to the present invention, incorporated therein.
Figure 2:
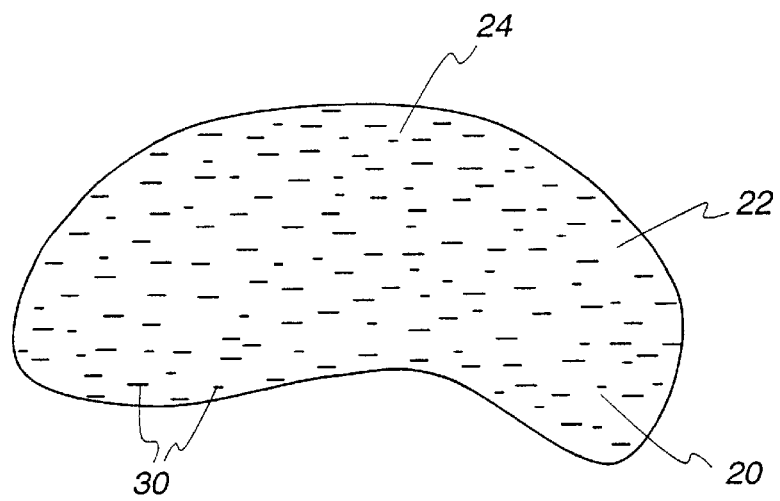
FIG. 2 is a fragmentary, plan view of a flattened portion of the transfer belt in FIG. 1.

In FIG. 1, a duplicator, with which the present invention can be used, is shown schematically at 10. The duplicator 10 shown uses electrophotographic technology to transfer an image to paper 12, that is in either sheet or web form. It is not necessary to understand the structural details, or details of operation, of the duplicator, as they may take many different forms well known to those skilled in this art. The pertinent portion of the duplicator 10 has spaced base elements 14, 15 which are rotated around parallel axes 16, 17. Th base element 16 is driven by a drive 18. A transfer belt 20 (see also FIG. 2), having an endless body 22, is surroundingly engaged with the base elements 14, 15 and moves in an elliptical path therearound. An outer, image transfer surface 24 is electrically charged to attract toner from a photoreceptor 26, which picks up toner from a supply 27. The image is then transferred from the surface 24 to the paper 12, which is appropriately charged to attract the toner. The transfer belt 20 is advanced in the direction of the arrow 28 as the paper advances in the direction of the arrow 29 during this transfer step.

While the construction of the transfer belt 20 varies significantly depending upon the system, an exemplary transfer belt 20 has a body 22 with a continuous construction that does not have exposed seams. The thickness T of the transfer belt 20 is from 300–600 $\mu$m. The width of the belt, which is the axial dimension thereof, is from 200–400 mm. The length of the transfer belt 20 around the axis 16 is from 400–1500 mm.

The body 22 is constructed from a rubber layer that is a combination of epichlorohydrin-ethyleneoxide copolymer and hydrogenated nitrile rubber. To this composition, a metallic salt of an unsaturated carboxylic acid is added, which is vulcanized with an organic peroxide.

The resulting belt may be made to have a medium resistance in the range of $10^8$ to $10^{11}$ $\Omega$cm. The resistance may be controlled to be substantially uniform throughout. The transfer belt so made may also have a high modulus without the use of fibrous material, that is either laminated thereto or embedded therein. By increasing the modulus, belt distortion may be reduced, as a result of which an image may be clearly transferred.

The epichlorohydrin-ethyleneoxide copolymer (CHC) used may be at least one of an epichlorohydrin-ethyleneoxide-allylglycidylether copolymer, an epichlorohydrin-ethyleneoxide-propyleneoxide-allylglycidylether copolymer, or the like. Preferably, the CHC is capable of being vulcanized with an organic peroxide. Those having a volume specific resistance of from $10^7$ to $10^9$ $\Omega$cm are preferred.

The hydrogenated nitrile rubber has a hydrogenation degree of 80% or more, and more preferably 90% or more, to provide good heat and ozone resistance. With hydrogenated nitrile rubber having a hydrogenation degree less than 80%, heat and ozone resistance may diminish significantly.

The metallic salt of an unsaturated carboxylic acid used with the hydrogenated nitrile rubber may be formed by ion-bonding an unsaturated carboxylic acid having a carboxyl group with a metal. The unsaturated carboxylic acid may be at least one of a monocarboxylic acid, such as acrylic acid, a methylacrylic acid, and the like, or a dicarboxylic acid, such as maleic acid, fumaric acid, itaconic acid, and the like. The metal may be at least one of beryllium, magnesium, calcium, strontium, barium, titanium, chromium, molybdenum, manganese, iron, cobalt, nickel, copper, silver, zinc, aluminum, tin, antimony and the like.

The metallic salt of an unsaturated carboxylic acid may be present in an amount from 5–200 parts by weight per 100 parts by weight of the combination of the epichlorohydrin-ethyleneoxide copolymer and the hydrogenated nitrile rubber. Preferably, it is present in an amount from 15–100 parts by weight. If the amount of the metallic salt of an unsaturated carboxylic acid is less than this, a suitable modulus may not be realized. If the amount is greater, it tends to attach to the rotor and the roll of the mixer, making working thereof difficult.

The organic peroxide is used as a crosslinking agent. At least one of di-t-butylperoxide, dicumylperoxide, t-butylcumylperoxide, 1,1-t-butylperoxy-3,3,5-trimethylcyclohexane, 2,5-dimethyl-2,5-di(t-butylperoxy)

hexane, 2,5-dimethyl-2,5-di(t-butylperoxy)hexane-3, bis(t-butylperoxydiisopropyl)benzene, 2,5-dimethyl-2,5-di(benzoylperoxy)hexane, t-butylperoxy benzoate, and t-butylperoxy-2-ethylhexyl carbonate, and the like, is used. This is mixed in an amount of from 0.2 to 10 parts by weight in pure peroxide per 100 parts by weight of the blended composition of epichlorohydrin-ethyleneoxide copolymer and the hydrogenated nitrile rubber. If less than 0.2 parts by weight is used, the crosslinking may not be fully carried out. If more than 10 parts by weight is used, the elasticity of the composition may be affected.

A simple hydrogenated nitrile rubber may be blended into a master batch, previously prepared by dispersing the metallic salt of an unsaturated carboxylic acid in the hydrogenated nitrile rubber. Short fibers may be added thereto, together with the organic peroxide, after which crosslinking takes place.

The ratio of epichlorohydrin-ethyleneoxide copolymer and hydrogenated nitrile rubber is from 10:90 to 90:10. If the amount of epichlorohydrin-ethylene-oxide copolymer exceeds this range, the desired modulus may not be obtainable. Below this range, resistance increases to the point that the desired electrical properties may not be obtained.

To increase the crosslinking efficiency of the organic peroxide, a co-crosslinking agent such as TAIC, TAC, maleimide, quinonedioxime, trimethylolpropane trimethacrylate, sulfur, and the like, may be used. In addition to the organic peroxide, known vulcanizing agents for epichlorohydrin-ethyleneoxide copolymers, epichlorohydrin-ethyleneoxide-allylglycidylether copolymers and epichlorohydrin-ethyleneoxide-propyleneoxide-allylglycidylether copolymers may be added. Suitable examples are red lead/ethylene tiourea and magnesium oxide/2,4,6-trimercapto-S-triazine.

A rubber filler, such as carbon black, silica, and the like, may be added to increase the modulus. It is preferred to use silica, which effectively increases the modulus if added in an amount of about 1–50 parts by weight per 100 parts by weight of the mixture of epichlorohydrin-ethyleneoxide copolymer and hydrogenated nitrile rubber.

Because a powder conductive agent, such as carbon black, is not necessary, variation in the volume specific resistance may be reduced to allow clear image transfer without significant variation in the density of the transferred image. Thus the resulting belt lends itself to being used effectively in transferring images in many different duplicating environments. This includes, but is not limited to, image transfer in electrostatographic duplicators and more particularly electrophotographic type duplicators, such as laser beam printers, facsimile machines, and the like.

Short fibers 30 are preferably embedded in the body 22. The fibers 30 may be formed by graft-bonding a polymer to polyamide fibers having a diameter of 3.0 $\mu$m or less. Alternatively, fine particles consisting of a polymer graft-bonded to particulate polyamide having a particulate particle diameter of 10 $\mu$m or less can be used.

Preferably, the fibers 30 are mixed in an amount that is no greater than 30 parts by weight per 100 parts by weight of the mixture of epichlorohydrin-ethyleneoxide copolymer and hydrogenated nitrile rubber. With the fibers 30 mixed in greater amounts, the resistance of the rubber composition may become greater than is desired.

The polymer grafted to the polyamide is preferably one selected from among polyolefins and rubbers. With the rubber selected from epichlorohydrin-ethyleneoxide copolymer or the hydrogenated nitrile rubber, or others having comparable qualities, a transfer belt having a sufficiently high modulus can be produced.

The transfer belt 20 may be produced as follows. A non-vulcanized rubber sheet, having a thickness of from 0.2 to 1.0 mm, is wound on a mold having a smooth outer surface. A jacket is fit around the sheet, after which the rubber sheet is vulcanized in a vessel at 140–170° C. for 20–40 minutes. After vulcanization, the mold is cooled and the vulcanized sheet is withdrawn therefrom. The sheet is then cut to a desired width by a cutter wheel. Preferably, the rubber sheet is trained around spaced rollers, placed under tension, and advanced therearound as the cutting is carried out. To make the thickness of the transfer belt uniform, a grinder may be used to effect surface polishing, as on the transfer surface 24. The properties of a belt made, as described above, will now be described below with respect to specific examples.

INVENTIVE EXAMPLES 1–5 AND
COMPARATIVE EXAMPLES 1–4

Components having the proportions shown in Table 1, below, were kneaded by an open roll to form a sheet having a thickness of 0.4 mm.

TABLE 1

|  | Inventive Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Epichlorohydrin-ethyleneoxide allylglycidylether copolymer *1 | 50 | 50 | 10 | 75 | 45 |  |  | 100 | 50 |
| Hydrogenated nitrile rubber *2 |  |  | 40 |  |  | 100 | 50 |  |  |
| Mixture of hydrogeated nitrile rubber and metallic salt of unsaturated carboxylic acid *3 | 50 | 50 | 50 | 20 | 50 |  | 50 |  | 50 |
| SHP LA5060 *4 |  |  |  | 15 | 15 |  |  |  |  |
| Stearic acid | 1 | 1 | 1 | 1 | 1 | 1 | 1 | 1 | 1 |
| Silica VN3 |  | 30 | 30 | 20 | 30 | 20 | 5 | 40 |  |
| Acetylene black |  |  |  |  |  | 17 | 17 |  |  |
| Carbon black SRF | 40 |  |  |  |  |  |  |  | 60 |
| Peroxide (DCP40) | 8 | 8 | 8 | 8 | 8 | 8 | 8 | 8 | 8 |
| MgO |  |  |  | 2 |  | 2 | 2 |  |  |
| TAlC |  |  |  |  |  | 1 |  |  |  |

TABLE 1-continued

| | Inventive Example | | | | | Comparative Example | | | |
| --- | --- | --- | --- | --- | --- | --- | --- | --- | --- |
| | 1 | 2 | 3 | 4 | 5 | 1 | 2 | 3 | 4 |
| Weight ratio of CHC/HNBR | 66/34 | 66/35 | 13/87 | 88/12 | 63/37 | 0/100 | 0/100 | 0/100 | 63/34 |
| Modulus on 10% elongation (Mpa) parallel to calender | 3.5 | 7.8 | 3.6 | 2.8 | 9.0 | 0.6 | 2.7 | 0.6 | 3.5 |
| (Mpa) perpendicular to calender | | 6.1 | | 2.0 | 6.5 | | | | |
| Volume specific resistance (Ωcm) N = 10 | | | | | | | | | |
| Average | $7.0 \times 10^8$ | $3.8 \times 10^9$ | $3.2 \times 10^{10}$ | $2.2 \times 10^8$ | $6.0 \times 10^9$ | $1.2 \times 10^9$ | $4.8 \times 10^9$ | $2.5 \times 10^7$ | $6.3 \times 10^5$ |
| Maximum | $2.0 \times 10^9$ | $6.1 \times 10^9$ | $4.6 \times 10^{10}$ | $4.3 \times 10^9$ | $8.5 \times 10^9$ | $9.5 \times 10^9$ | $4.3 \times 10^{10}$ | $3.7 \times 10^7$ | $7.5 \times 10^7$ |
| Minimum | $6.7 \times 10^5$ | $2.6 \times 10^9$ | $2.2 \times 10^{10}$ | $6.7 \times 10^9$ | $4.7 \times 10^9$ | $2.0 \times 10^8$ | $3.2 \times 10^8$ | $1.4 \times 10^7$ | $1.6 \times 10^5$ |

*1 Gechron (produced by Nippon Zeon Co., Ltd.)
*2 Zetpoi 2020 (produced by Nippon Zeon Co., Ltd.)
*3 ZSC2295N (produced by Nppon Zeon Co., Ltd., 100/90 blend of Zetpol 2020/zinc metharcrylate
*4 HNBR graft 6-nylon fiber (HNBR produced by Ube Industries, Ltd./6-nylon/polyethylene = 100/100/100)

The resulting composition was then wound twice around a smooth surface on a mold having a diameter of 150 mm. A vulcanizing jacket was placed therearound, followed by vulcanizing at 165° C. for 30 minutes. After vulcanization, the rubber sheet, which had a thickness of 0.8 mm, was separated from the cooled mold and cut to a width of 230 mm by a cutter while advancing the rubber sheet around spaced rollers. The resulting belt was then polished to a thickness of 0.4 mm.

The resulting transfer belt was then tested to measure modulus at 10% elongation, using low tension stress test JIS K6301. Volume specific resistance was determined using a high resistivity meter, identified by Mitsubishi Chemical Corp. as its model number HIRETUS UP MCP-HT450.

It can be see that the volume specific resistance of inventive example 1, containing 40 parts by weight of carbon black, was not greatly lowered, with relatively little variation in resistivity, compared to inventive example 2, containing silica. This demonstrates that the volume specific resistance is not greatly affected by the carbon black chain.

Inventive example 2 had an extremely high modulus compared to those belts reinforced with carbon black. Inventive example 3 had a low CHC amount and a stable high volume specific resistance. On the other hand, inventive example 4 had a large amount of CHC and was stable at a low level of volume specific resistance. In inventive example 5, the modulus was further increased in comparison to inventive example 3, while maintaining stable volume specific resistivity.

On the other hand, comparative example 3 had a low modulus and did not include a blend of CHC and HNBR.

The foregoing disclosure of specific embodiments is intended to be illustrative of the broad concepts comprehended by the invention.

What is claimed is:

1. A transfer belt for use in an electrostatographic duplicator, said belt comprising:
a body defining an image transfer surface,
said body comprising a rubber composition comprising a combination of epicyhlorohydrin-ethyleneoxide copolymer and hydrogenated nitrile rubber to which a metallic salt of an unsaturated carboxylic acid and an organic peroxide are added.

2. The transfer belt according to claim 1 wherein the body further comprises short fibers embedded in the body.

3. The transfer belt according to claim 2 wherein the short fibers comprise a polymer graft-bonded to polyamide fibers.

4. The transfer belt according to claim 3 wherein the short fibers have a diameter not greater than 3.0 μm.

5. The transfer belt according to claim 1 wherein the body further comprise silica in an amount of 1:50 parts by weight of silica per 100 parts by weight of the combination of epichlorohydrin-ethyleneoxide copolymer and hydrogenated nitrile rubber.

6. The transfer belt according to claim 1 wherein the epichlorohydrin-ethyleneoxide copolymer comprises at least one of an epichlorohydrin-ethyleneoxide-allylglycidylether copolymer and an epichlorohydrin-ethyleneoxide-propyleneoxide-allylglycidylether copolymer.

7. The transfer belt according to claim 1 wherein the hydrogenated nitrile rubber has an oxidation degree of at least 80%.

8. The transfer belt according to claim 1 wherein the hydrogenated nitrile rubber has an oxidation degree of at least 90%.

9. The transfer belt according to claim 1 wherein the metallic salt of an unsaturated carboxylic acid is formed by ion-bonding an unsaturated carboxylic acid having a carboxyl group with a metal.

10. The transfer belt according to claim 9 wherein the unsaturated carboxylic acid comprises at least one of: a monocarboyxlic acid; a monocarboyxlic acid comprising acrylic acid; a methacrylic acid; a dicarboxylic acid; a dicarboxylic acid comprising maleic acid; a dicarboxylic acid comprising fumaric acid; and a dicarboxylic acid comprising itaconic acid.

11. The transfer belt according to claim 9 wherein the metal comprises at least one of beryllium, magnesium, calcium, strontium, barium, titanium, chromium, molybdenum, manganese, iron, colbat, nickel, copper, silver, zinc, aluminum, tin, and antimony.

12. The transfer belt according to claim 1 wherein the metallic salt of an unsaturated carboxylic acid is present in an amount of 5–200 parts by weight per 100 parts by weight of the combination of epichlorohydrin-ethyleneoxide copolymer and hydrogenated nitrile rubber.

13. The transfer belt according to claim 1 wherein the organic peroxide comprises at least one of di-t-butylperoxide, dicumylperoxide, t-butylcumylperoxide, 1,1-t-butylperoxy-3,3,5-trimethylcyclohexane, 2,5-dimethyl-2,5-di(t-butylperoxy)hexane, 2,5-dimethyl-2,5-di(t-butylperoxy)hexane-3, bis(t-butylperoxydiisopropyl) benzene, 2,5-dimethyl-2,5-di(benzoylperoxy)hexane, t-butylperoxy benzoate, and t-butylperoxy-2-ethylhexyl carbonate.

14. The transfer belt according to claim 13 wherein the organic peroxide is present in an amount of 0.2 to 10 parts by weight pure peroxide per 100 parts by weight of the combination of epichlorohydrin-ethyleneoxide copolymer and hydrogenated nitrile rubber.

15. The transfer belt according to claim 1 wherein the ratio of epichlorohydrin-ethyleneoxide copolymer to hydrogenated nitrile rubber is between 10:90 and 90:10.

16. The transfer belt according to claim 1 further comprising a co-crosslinking agent to increase the crosslinking efficiency by the organic peroxide, the co-crosslinking agent comprising at least one of TAIC, TAC, maleimide, quinonedioxime, trimethylolpropane trimethacrylate, and sulfur.

17. The transfer belt according to claim 1 further comprising a vulcanizing agent for the epichlorohydrin-ethyleneoxifde copolymer comprising at least one of red lead/ethylene tiourea and magnesium oxide/2,4,6-trimercapto-S-triazine.

18. The transfer belt according to claim 1 further comprising a filler for the rubber in the body that comprises at least one of carbon black and silica.

19. The transfer belt according to claim 2 wherein the short fibers are present in an amount of no more than 30 parts by weight per 100 parts by weight of the combination of epichlorohydrin-ethyleneoxide copolymer and hydrogenated nitrile rubber.

20. The transfer belt according to claim 3 wherein the polymer grafted to the fibers comprises at least one of polyolefin and rubber.

21. The transfer belt according to claim 1 wherein the body has a thickness of from 300 to 500 $\mu$m.

22. An electrostatographic duplicator comprising:

a base element having a transfer belt thereon as in any of claims 1–21;

a toner supply which is strategically transferred to the image transfer surface on the body of the transfer belt; and a drive for rotating the base element to thereby cause an image on the image transfer surface to be applied to an object.

* * * * *